(12) United States Patent
Fraser

(10) Patent No.: US 7,575,023 B2
(45) Date of Patent: Aug. 18, 2009

(54) DISPOSABLE BREAKAWAY NOZZLE CONNECTOR

(75) Inventor: Craig J. Fraser, New Haven, MO (US)

(73) Assignee: Husky Corporation, Pacific, MO (US)

( * ) Notice: Subject to any disclaimer, the term of this patent is extended or adjusted under 35 U.S.C. 154(b) by 46 days.

(21) Appl. No.: 11/503,562

(22) Filed: Aug. 11, 2006

(65) Prior Publication Data

US 2008/0035222 A1   Feb. 14, 2008

(51) Int. Cl.
    *F16L 37/32* (2006.01)
(52) U.S. Cl. .............................. 137/614.04; 137/68.15; 285/1; 285/304; 285/900
(58) Field of Classification Search .................. 137/67, 137/68.1, 68 R, 69, 71, 614.01, 614.02, 614.03, 137/614.04, 543.17, 797, 68.14, 68.15; 251/149.2, 251/149.6, 149.7; 141/98, 206, 382–387, 141/392; 285/1, 2, 304, 900
See application file for complete search history.

(56) References Cited

U.S. PATENT DOCUMENTS

| | | | |
|---|---|---|---|
| 1,410,218 A | 3/1922 | Palmer | |
| 2,048,388 A | 7/1936 | Johnsen | |
| 2,135,221 A | 11/1938 | Scheiwer | |
| 2,452,430 A | 10/1948 | Clark et al. | |
| 2,455,544 A | 12/1948 | Yonkers | |
| 2,536,702 A | 1/1951 | Scheiwer | |
| 2,599,935 A * | 6/1952 | Pasker | 137/614.04 |
| 2,631,872 A | 3/1953 | Wurmser | |
| 2,642,297 A | 6/1953 | Hanna | |
| 2,777,716 A | 1/1957 | Gray | |
| 2,860,893 A | 11/1958 | Clark | |
| 2,898,926 A | 8/1959 | Tsiguloff | |
| 2,906,280 A | 9/1959 | Mount | |
| 3,085,589 A | 4/1963 | Sands | |
| 3,122,162 A | 2/1964 | Sands | |
| 3,138,393 A | 6/1964 | Livingston | |
| 3,317,220 A | 5/1967 | Bruning | |
| 3,334,860 A | 8/1967 | Bolton, Jr. | |
| 3,715,099 A | 2/1973 | Shendure | |
| 3,741,521 A | 6/1973 | Tatsuno | |
| 3,836,114 A | 9/1974 | Norton et al. | |
| 3,918,679 A | 11/1975 | Silvana | |
| 4,060,219 A | 11/1977 | Crawford | |
| 4,064,889 A | 12/1977 | Gayle et al. | |
| 4,070,003 A | 1/1978 | Shames et al. | |
| 4,098,438 A | 7/1978 | Taylor | |
| 4,119,111 A | 10/1978 | Allread | |

(Continued)

*Primary Examiner*—John Rivell
*Assistant Examiner*—Craig Price
(74) *Attorney, Agent, or Firm*—Paul M. Denk

(57) ABSTRACT

A disposable breakaway hose connector for a fuel line prevents untimely decoupling, and avoids unnecessary leakage. The breakaway connector includes a pair of fittings, for connecting to the fuel line, an inner sleeve provided for limited sliding movement upon one of the fittings, with each fitting incorporating a poppet valve, to provide for closure when decoupling occurs, or other unseating, from within the respect fittings, during normal aggregate and usage. Detents are provided within one of the fittings for interconnecting to normally retain the connector as assembled, but various O-rings arranged within an inner sleeve and upon one of the fittings, provide for limited movement when tensioning force is exerted and clearance for disconnection. A fluid chamber is provided intermediate of the O-rings, to equalize and counterbalance fluid pressures that occasionally spike within the connector and hose line.

14 Claims, 2 Drawing Sheets

U.S. PATENT DOCUMENTS

| | | | |
|---|---|---|---|
| 4,124,228 A | 11/1978 | Morrison | |
| 4,307,744 A | 12/1981 | Marrison | |
| 4,392,513 A | 7/1983 | Parrish | |
| 4,449,545 A | 5/1984 | Vernor et al. | |
| 4,617,975 A | 10/1986 | Rabushka et al. | |
| 4,646,773 A * | 3/1987 | Klop et al. | 137/68.15 |
| 4,667,883 A | 5/1987 | Fink, Jr. | |
| 4,674,525 A * | 6/1987 | Richards et al. | 137/68.15 |
| 4,691,941 A | 9/1987 | Rabushka et al. | |
| 4,827,977 A | 5/1989 | Fink, Jr. | |
| 4,886,087 A * | 12/1989 | Kitchen | 137/68.14 |
| 4,896,688 A * | 1/1990 | Richards et al. | 137/68.15 |
| 4,899,792 A * | 2/1990 | Podgers | 141/382 |
| 5,054,509 A * | 10/1991 | Grantham | 137/68.14 |
| 5,297,574 A * | 3/1994 | Healy | 137/68.15 |
| 5,365,973 A | 11/1994 | Fink, Jr. et al. | |
| 5,529,085 A * | 6/1996 | Richards et al. | 137/68.15 |
| 6,182,695 B1 | 2/2001 | Coates, III et al. | |
| 6,192,934 B1 * | 2/2001 | Coates et al. | 137/614.04 |
| 7,021,345 B2 * | 4/2006 | Webb | 141/382 |
| 2004/0123899 A1 * | 7/2004 | Turvey | 137/68.15 |

* cited by examiner

DISPOSABLE BREAKAWAY NOZZLE CONNECTOR

CROSS-REFERENCE TO RELATED PATENTS

The subject matter of this application is related to the subject matter of the patents of Arthur C. Fink, Jr. and Thomas O. Mitchell, pertaining to Breakaway Concentric Hose Connector, now U.S. Pat. No. 5,365,973, Breakaway Hose Connector now U.S. Pat. No. 4,827,977, and Butterfly Valve for Fluid Flow Line, now U.S. Pat. No. 4,667,883, and owned by a common assignee.

BACKGROUND OF THE INVENTION

This disposable and breakaway nozzle connector relates in general to means for preventing and stopping fluid passage through a flow line, such as a gasoline line used in conjunction with fuel dispensing at a service station, and more specifically to improvements within the connector useful when a severance occurs in the line, and when a loss of fluid may be encountered, such as when a vehicle may drive off with the gasoline nozzle inadvertently still inserted within the vehicle fuel tank. A unique aspect of the present connector is a trio of O-rings that reduce pressure on the shear pins, and thus reducing premature breaks in the connector. This invention is especially useful when applied in a fuel line, and functions as a check valve to prevent fuel flow under particular adverse conditions, particularly when the breakaway hose is disconnected.

As is well known in the art and the public, fuel dispensing nozzles as used in most service stations have a spout which is inserted into the inlet of the filler pipe of a vehicle fuel tank. The diameter of the spout is less than that of the filler pipe and consequently, fuel vapors escaped into the atmosphere. Escaped fuel vapors raised pollution concerns and triggered government regulation of fuel dispensing nozzles. Environmental requirements have made it essential that vapors and fumes generated during fuel dispensing be collected to prevent the emission of such fumes into the atmosphere. Environmentalists have stated that these types of fumes may be detrimental to the quality of our air.

Numerous valves in the prior art furnish a shut-off of fluid or other fuel flow, and more particularly, such mechanisms normally are utilized in lines where fuel may be flowing, and generally in those situations when the conduit comprises the fuel line leading from a fuel dispenser to its nozzle. For example, as can be seen in the U.S. Pat. No. 2,642,297, to Hanna, a breakaway coupling responds to tension in the line and is held together through a combination of male and female couplings, and detents that provide bearing engagement between the two components. In addition, the U.S. Pat. Nos. 4,617,975, and 4,691,941, to Rabushka, disclose various types of tension actuated uncouplers, for delivering gasoline to a vehicle from a gas pump. These prior patents portray devices that tend to leak, and when any internal pressure is exerted within the fuel line, such as may occur when pumping the fuel, excessive pressures may momentarily arise within the fuel line, and particularly at the location of the uncoupler, and in some instances, has actually forced the coupling device to prematurely come apart. Obviously, this is not desirable or acceptable.

This predicament has generally been recognized by the Applicant as primarily occurring in those breakaway couplings that are constructed having unequal internal surfaces. The internal surfaces cause greater fluid forces to be exerted in one direction upon one part of the breakaway coupling than is exerted upon the other, and are inherent because of the construction of the breakaway coupling device. When these spontaneous and unequal high pressures are encountered, the pressure exerted upon one component of the breakaway coupling device in one direction, is substantially different from the fluid pressure that may be exerted upon the other component of the breakaway coupling device, and therefore, this pressure disparity tends to force the coupler to prematurely separate, in an untimely and dangerous fashion. This can and has occurred particularly where the fluid pressure in the hose may undertake a phenomenon that is equivalent to "water hammer."

Originally from water supply plumbing, water hammer refers to the concussion induced into plumbing by water brought to a sudden stop. In an evacuated hose, fitting, or nozzle, fuel in the absence of air can cause a similar concussion to a fuel line or coupling as a moving mass of fuel suddenly stops. Couplings endure this concussion generally as fueling stops when a nozzle automatically or manually shuts off, often abruptly.

The lengths of hose, fittings, and nozzles require connection among themselves and to service station pumping facilities. Hoses, fittings, and nozzles have couplings that breakaway when an errant motorist drives away with a hose in a vehicle, and thus preventing a fiery catastrophe. Until a breakaway, a coupling joins two sections of a fueling line and permits passage of fuel therethrough. As fuel pumps through the flow line, pressure spikes over rather significantly and substantially throughout the hose, momentarily, and even at the location of the coupling, as when the flow is suddenly stopped, as for example, when the fuel tank is full. Hence, leakage at such couplers has frequently occurred in the field, and on occasion, as previously explained, untimely separation of the coupling has happened.

Couplings generally have two halves, a male fitting and a female fitting the male fitting joins to a hose, fitting or nozzle and has an extended spacer means. The female fitting joins to a second hose, fitting, or nozzle and has a hollow cylindrical center to receive a spacer means. The female fitting engages the coupling by two diametrically opposed shear pins provided towards the rear of the female fitting and a plurality of locking bearings towards the front of the female fitting. Upon inserting the spacer means into the female fitting, the male fitting abuts the locking bearings.

Between the locking bearings and the shear pins, pressure rises and falls depending upon the fuel flow through the coupling and the male fitting and the female fitting. Prior art designs provided an empty space between the locking bearings and the shear pins to absorb pressure fluctuations. In use though, the "water hammer" like effects during fueling induced excessive pressure upon the shear pins which would break repeatedly even with proper fueling and nozzle handling by motorists. Such nuisance breaks occur often and service stations then have to close a pump temporarily while the existing coupling is replaced.

DESCRIPTION OF THE PRIOR ART

Other patents that show various related uncoupling devices include the U.S. Pat. No. 4,449,545, disclosing a poppet valve having a conical surface that is disposed for seating upon a valve seat, when breakage occurs between the plug and socket of the shown valve. A great variety of other types of hose couplers are used in the art, as can be seen in the U.S. Pat. No. 2,777,716, to Gray, showing a socket type hose coupler with reciprocating detent. Another form of quick disconnect coupler and safety check valve is shown in U.S. Pat. No. 4,060, 219, to Crawford. The patent to Shames, U.S. Pat. No. 4,070,003, also discloses a coupler with automatic shut-off, but the sealing means provided therein has substantial size, and causes significant disruption to the normal flow of fluid through the coupler. Another type of valve assembly is shown in U.S. Pat. No. 4,307,744, to Morrison. An additional form of breakaway safety valve is shown in U.S. Pat. No. 4,064,889, to Gayle, wherein a ball valve prevents the discharge of gasoline vapors in a break.

Other patents showing decoupling devices, for use in flow lines, are shown in the U.S. Pat. No. 2,906,280, to Mount, entitled "Breakaway Coupling." The U.S. Pat. No. 3,741,521, to Tatsuno, shows a pipe coupling with safety valve. The U.S. Pat. No. 1,410,218, to Pamer, discloses a gas valve. The U.S. Pat. No. 2,898,926, to Tsiguloff, shows a safety disconnect valve for fuel dispensing. The U.S. Pat. No. 3,085,589, to Sands, discloses a safety valve. Another patent to Sands, U.S. Pat. No. 3,122,162, shows a flow control device. The patent to Shames, U.S. Pat. No. 4,070,003, shows a coupler with automatic shut-off. The patent to Allread, U.S. Pat. No. 4,119,111, discloses a frangible hose end fitting. The patent to Johnson, U.S. Pat. No. 2,048,388, discloses another form of safety device, for fuel dispensing. The patent to Scheiwer, U.S. Pat. No. 2,135,221, discloses a coupling used within a flow line. The patent to Clark, U.S. Pat. No. 2,452,430, shows another form of quick disconnect coupling. The patent to Yonkers, U.S. Pat. No. 2,455,544, shows a related type of pipe coupling.

The patent to Scheiwer, U.S. Pat. No. 2,536,702, discloses a coupling for use within a flow line, and incorporating the ball type coupling members. Pasker, U.S. Pat. No. 2,599,935, discloses a hydraulic line coupling. Wurmser, U.S. Pat. No. 2,631,872, discloses a quick coupling device for flow lines. Clark, in his U.S. Pat. No. 2,860,893, shows a ball detent type coupling with breakaway feature. Burning, U.S. Pat. No. 3,317,220, shows a releasable fluid coupling. Bolton, Jr., in U.S. Pat. No. 3,334,860, discloses a fluid coupling. Shendure, U.S. Pat. No. 3,715,099, discloses a valved quick-disconnect coupling. Silvana, in U.S. Pat. No. 3,918,679, discloses a universal coupling. Taylor, in his U.S. Pat. No. 4,098,438, discloses a gasoline spill prevention system. The patent to Morrison, U.S. Pat. No. 4,124,228, shows a pressure-balanced fluid coupling. The patent to Parrish, U.S. Pat. No. 4,392,513, shows a quick disconnect safety coupling. A similar type of coupling assembly is shown in the patent to Norton, et al., U.S. Pat. No. 3,836,114. Livingston, in U.S. Pat. No. 3,138,393, shows a coupling for substantially axially fixed conduits. Morrison, in U.S. Pat. No. 4,124,228, shows a pressure-balanced coupling. These are examples of various prior art breakaway coupling devices, primarily for use within a fluid flow line, and, some are of the breakaway type.

Other patents that have issued to the Assignee of the patent application herein include the patent to Fink, Jr., U.S. Pat. No. 4,827,977, upon Breakaway Hose Coupling. A further patent to Fink, Jr., et al., U.S. Pat. No. 5,365,973, shows a further Breakaway Concentric Hose Coupling. Another patent to Coates, II, et al., U.S. Pat. No. 6,182,695, shows a further Breakaway Coupling and Coupler Therefore. Finally, the patent to Coates, et al, U.S. Pat. No. 6,192,934, shows an additional improvement in Breakaway Concentric Hose Coupling.

The difficulty in providing a breakaway nozzle coupling is also shown by the existing means to respond to nuisance breaks. Fuel line providers have added more shear pins to their coupling designs. The greater number of pins reduces the force absorbed by each pin. However, given enough cycles of fueling, the shear pins of greater number still fatigue and break unexpectedly. The variability in time to failure by fatigue leads to heavier and redundant coupling designs as the failure time defies accurate prediction.

The present art overcomes the limitations of the prior art. That is, the art of the present invention, a disposable breaker nozzle coupling, uses a pressure chamber within O-rings to buffer line pressures applied to a coupling thus reducing the incidence of nuisance breaks.

SUMMARY OF THE INVENTION

A disposable breakaway nozzle connector begins with a male fitting and a female fitting inserted into one another. The female fitting has spaced apart shear pins and locking bearings provided upon its perimeter. Between the shear pins and the locking bearings, the present invention has a pressure chamber bounded by two parallel O-rings. Proximate to the locking bearings, the male fitting has a third O-ring. The first O-ring is secured by a first retaining ring upon the female fitting, the second O-ring is secured and spaced back from the first O-ring by a second retaining ring upon the female fitting, and the third O-ring is secured within a groove on the interior of the male fitting. The third O-ring seals upon the outside of the female fitting at the tip. The pressure chamber attains line pressure, generally the static fluid pressure, between the first and second O-rings. As the dynamic fluid pressure increases or spikes, the pressure chamber absorbs the pressure increase, thus protecting the shear pins. The pressure chamber provides a known pressure at which the connector will fail. Knowing a failure pressure, connectors using the present invention are designed for failure pressure and not over designed for an unknown fatigue life.

Within the female fitting, two O-rings are parallel and spaced apart. The space between the first O-ring and the second O-ring forms a pressure chamber. The second O-ring is located towards an end of the connector and the first O-ring is located towards the center of the connector. Ahead of the first O-ring, a plurality of locking bearings seal the joint between the edge of the male fitting and the female fitting. The locking bearings are generally spaced evenly around the circumference of the female fitting. A third O-ring occupies a groove upon the interior of the male fitting. The third O-ring accepts the tip of the female fitting and provides the initial seal of the male fitting to the female fitting. The third O-ring is also parallel to the first and second O-rings as previously described.

Generally, the male fitting of the connector simply slides into and interconnects with the female fitting for quick installation. Strategically located O-rings provide for fluidic sealing of the various components and withstand pressure variations. The present invention does not require the use of any type of biasing springs, or other mechanisms, to provide for its quick and simple installation. Although, optionally, a wave spring or other spring may be used if a biasing force is necessary.

This invention contemplates the formation of a disposable breakaway nozzle connector, of the type that may be used within a fuel flow line, but preferably a fuel line that conveys gasoline from a dispensing pump to and through a nozzle into a vehicle fuel tank. More preferably, this invention has been designed containing rather unique components that provide for and assure the retention of the breakaway connector in its connected and assembled state, and to prevent any leakage, or untimely disconnection from any internally generated forces, such as fluid flow or fluid spike pressures, that may spontaneously occur within the flow line, particularly when the flow of fuel suddenly stops. This feature is primarily encountered through the recognition that a disparity of forces acting against various parts of earlier decoupling devices did not fully recognize causes of premature decoupling due to a greater force acting against one of the separable components of the breakaway connector than the other. When any instantaneous pressure may be encountered within the connector, the substantial forces generated internally break apart the connector, in an untimely fashion.

And, even if any disparity of forces generated within the connector is not sufficient to cause an untimely decoupling, such internal pressures, and their misdirected forces, at least have a tendency to cause an incipient partial separation, and enough of an opening within the connector that undesirable leakage will at least occur. Hence, this current invention is constructed containing designed components, fabricated into a particular configuration, so that any internal forces generated by the fluids passing within the flow line and the connector, are equal to each other, in discrete directions, and therefore, do not affect any substantial and unequal forces, within the connector, and thereby prevent untimely disconnection, or leakage.

Generally, as well known in the art, breakaway hose connectors are usually designed to provide separation when errant drivers pull away from the station pumps, with the gasoline nozzle and hose still connected within their vehicle's fuel tank. Under such a drive away situation, it is well documented that when disconnection occurs, breakage of the hose follows, and without the usage of some type of decoupling device, as explained in this current invention, fuel continues to be pumped and spilled upon the service station, a very hazardous and disastrous predicament. Utilizing a breakaway connector of this invention, prevents and curtails further fuel flow.

In addition, when prior art decoupling devices are affixed on a fuel flow line in routine use, internal pressure spikes or water hammer are generated within the fuel lines. The enormous pressures that instantaneously arise can cause an untimely separation of the prior art decoupling devices, or even at least some undesirable fuel leakage. Hence, this current invention has been designed to prevent any untimely disconnection, because of internal fluid pressures, and even to avoid leakage, by providing designed chambers within the breakaway connector, equalize the disparity of any pressures generated within the connector, and thereby prevent spiked pressures from acting upon the connector, and thereby prevent untimely disconnection.

These are conditions that can cause unwanted breakaway hose connector separations that result in equipment down time. In most instances, these nuisance breaks are caused by an immediate sudden build-up of pressure inside the fueling hose. A sudden pressure increase travels through the hose to the breakaway connector, and forces it apart. The sudden pressure build-up can be caused when a nozzle immediately shuts off while fueling under high volume or high pressure. The sudden build-up of pressure in the fuel line can even cause the connector to separate. However, an even greater pressure can be created when a forced stretching of the hose constricts its internal diameter, as when being abusively used.

The breakaway hose connector of this invention eliminates these nuisance breaks. This invention has a pressure balancing chamber within it that overrides any sudden increase in pressure within the hose, during application. The breakaway connector of this invention will still separate under routine usage and under a drive away situation, when a predetermined force is exerted upon it. And, when this detrimental condition is encountered, the connector separates as planned, thus preventing a disastrous fuel spill. But, as explained, the connector of this device has further been improved so as not to prematurely separate when subjected to internal line shock pressures, a condition that generally causes unnecessary connector breaks, in the prior art.

In addition to the foregoing the breakaway hose connector of this invention is one that can be quickly and easily manually snapped together after a drive away break, by anyone exerting just hand strength against the two separated fittings and then the unit is reassembled and ready for usage again. No other parts are required for replacement or reconditioning for immediate routine usage of the fuel pumping facilities in which the connector device is installed. This unit is disposable and not re-connectable.

Therefore, it is an object of the invention to provide a new and improved disposable breakaway nozzle connector for fuel lines.

It is a further object of the present invention to dissipate the abrupt pressure spikes generated within the breakaway connector during its functioning within a flow line thus preventing undesirable fuel leakage, or untimely separation, of the type heretofore caused in other connectors and retaining the shear pins and alleviating nuisance breaks.

It is a still further object of the present invention to provide a known pressure thus regulating the degree of tensioning force to be exerted upon a connector to effect its disconnection.

It is a still further object of the present invention to provide a hose breakaway connector device that is designed to pull apart at a predetermined force, being unaffected by any of the internal fluid pressures generated during its routine usage.

It is a still further object of this invention to provide a pressure chamber to isolate shear pins from "water hammer" effects during fueling as the chamber has generated therein internal fluid pressure that creates a force equal and opposite to the primary force that prematurely causes separation of the connector.

Another object of this invention is to provide a connector device wherein its locking bearings are normally located within seats and which are held generally outwardly thereof, and into a locked engagement during normal and routine usage of the coupler when installed within a fluid flow line.

A further object of this invention is to provide a breakaway connector that may be preset for disengagement of its separable parts upon exertion of a predetermined externally applied tension force, and once separated, its shut off valves effectively stop the further passage of fluid in either direction or from either hose section, but normally this breakaway is disposable and not of the reassembled type. On the other hand, it may be that the breakaway connector could be established as a reassembled type.

These and other objects may become more apparent to those skilled in the art upon review of the invention as described herein, and upon undertaking a study of the description of its preferred embodiment, when viewed in conjunction with the drawings.

BRIEF DESCRIPTION OF THE DRAWINGS

The same reference numerals refer to the same parts throughout the various figures.

DESCRIPTION OF THE PREFERRED EMBODIMENT

Figures 1, 2:
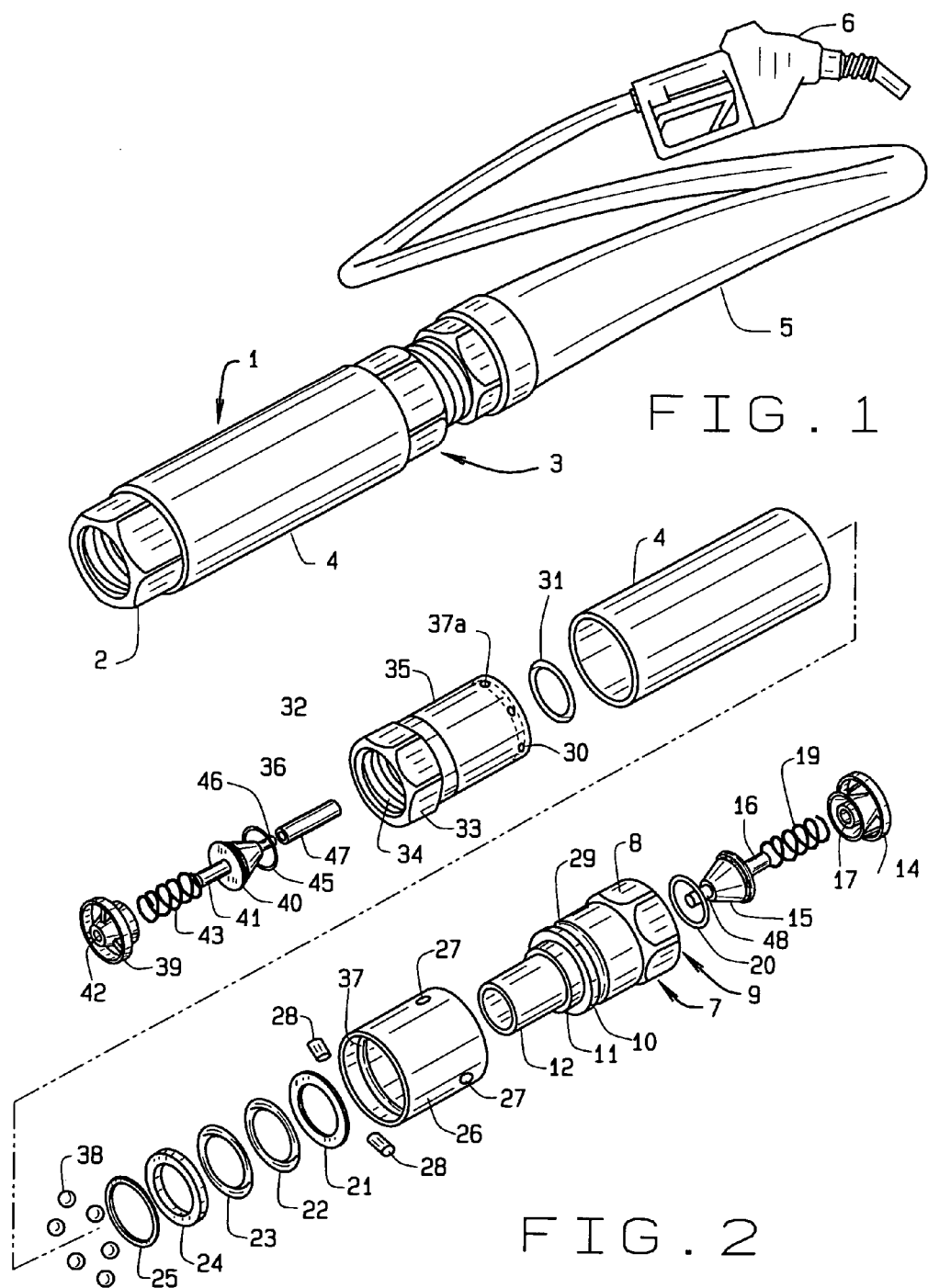
FIG. 1 shows the disposable breakaway nozzle connector of this invention, as assembled and connected to a fuel hose and connecting at its opposite end with the fuel dispensing nozzle.
FIG. 2 provides an exploded view of the various components assembled into the disposable breakaway nozzle connector of this invention.

The present art overcomes the prior art limitations by providing a pressure chamber between O-rings to absorb abrupt pressure fluctuations within a connector. Turning to FIG. 1, the disposable breakaway nozzle connector 1 of this invention is disclosed, and comprises a male fitting 2 and a female fitting 3 that connect and which have a fuel line and nozzle mounted thereon. An outer sleeve 4 is provided upon the connector 1. Tough the outer sleeve 4 and other components are shown and described with round cross-sections, other cross-sections are possible in alternate embodiments. The connector connects at one end with a fuel line hose 5, or which may connect at its other end with a fuel dispensing nozzle 6, as shown, or with additional hose.

In referring to FIG. 2, the individual components that make up the connector 1 of this invention are disclosed, in exploded view. As can be seen, a first fitting 7, corresponding to the female fitting 3, includes a nut like member 8, to provide for its threaded engagement onto a fuel line hose or nozzle. The member 7 includes a forward extension, as at 10, and which is designed for fitting within the outer sleeve 4, but yet having limited sliding capability within said outer sleeve, in a manner to be subsequently described. The forward extension has two opposite holes for connection with shear pins as subsequently described. A further integral shoulder 11 is provided forwardly of the extension 10, and integrally connected forwardly thereof is another extension 12, as noted.

Disposed for mounting within the first fitting 7, and more particularly within its extension 10, is a spider like mount 14, which is fixed stationary therein, and provides a means for supporting the poppet valve 15 within the fitting. The poppet valve 15 contains a stem 16, and the stem is designed for sliding and fitting within the support sleeve 17 formed on the mount 14. A spring 19 surrounds the support stem 17, and biases against the back surface of the poppet valve 15, and thereby normally biases the said poppet valve forwardly within its fitting 7, and into engagement with the formed valve seat within said fitting. An O-ring 20 mounts upon the surface of the poppet valve 15, to provide sealed closure for the poppet valve, when it enters into closure against its cooperating valve seat.

Provided for firm mounting upon the extension 10 is a stationary means or second retaining ring 21 formed in the configuration of a ring, as noted, having a second O-ring 22 mounted upon its outer circumference or perimeter, with a first O-ring 23 provided forwardly thereof, and to provide for a sealed and spaced gap from the second O-ring 22; and provided forwardly thereof, a retaining ring having a square shaped member 24 formed into the configuration of a ring as noted here; and provided forwardly thereof towards the tip of the extension 10, a first retaining ring 25 having a flat shaped member formed into the configuration of a ring as noted here. The preceding O-rings and retaining rings fit upon the circumference of the extension 10. Fitting over the preceding O-rings and retaining rings is an inner sleeve 26. The inner sleeve 26 has an inner diameter sized for a snug fit upon the preceding O-rings and retaining rings. Upon one end towards the nut like member 8, the inner sleeve has two or more opposite holes 27. Shear pins 28 are placed through the holes in the inner sleeve and then into groove 29 in the extension 10. The shear pins place the inner sleeve in final position upon the extension 10. Opposite the holes in the inner sleeve, the other end of the inner sleeve has a plurality of detents 37 regularly spaced upon the inner diameter of the inner sleeve. These detents receive locking bearings 38 inserted upon the inner diameter of the inner sleeve just prior to attaining the final position of the inner sleeve towards the nut like member 8.

But, it must be noted that the space between the second O-ring and the first O-ring forms a supplemental fluid pressure chamber, as previously summarized, and which is designed to equalize and balance the forces generated within the connector, so as to prevent inadvertent or untimely disconnection of the connector, when sudden internal pressure may develop within the fuel hose line in the manner as previously explained.

All of the components as previously described, are assembled in conjunction with the first fitting 7, and in combination with the outer sleeve 4, form a female fitting of the breakaway connector of this invention. The male fitting and the female fitting allow a break in their mutual connection under certain conditions: primarily a drive off from a vehicle bearing a hose.

As also disclosed in FIG. 2, a second fitting 32, corresponding to the previous male fitting 2, includes a nut like formed member 33, having a series of internal threads located therein, as at 34, which likewise are designed for providing a connection of this second fitting to either the opposite extending hose, or other fuel line, as explained. The fitting 32 includes a forward extension 35, integrally formed with the nut like member 33, and as can be seen, there is a passage or channel provided therethrough, as at 36, that allows for fluid to be conveyed through the connector device, during it assembly and usage. At the frontal end of the extension 35 is an internal groove 30 upon the inner circumference of the extension 35 and the groove holds a third O-ring 31 of the present invention. The third O-ring fits around the forward extension 12 of the female fitting 3 and provides a seal against fuel migrating from the male fitting 2 towards the locking bearings of the female fitting and inner sleeve.

Provided for fixed mounting within the extension 35 is the spider mount 39, and it likewise supports the poppet valve 40, whose rearward extension 41 fits within the stem support 42, formed within the mount 39, and with the spring 43 normally biasing the poppet valve 40 against the valve seat formed within the fitting 32. An O-ring 45 fits on the valve 40, so as to assure a fluid tight seal when the valve is seated upon its valve seat, as can be understood. There is a forward extension 46 provided forwardly of the poppet valve 40, and it supports a separator tube or spacer 47, such that when the fitting 32 is conveniently installed fully within the male fitting 7, and its outer sleeve 4, the separator stem 47 biases against the stem 48 of the oppositely aligned poppet valve 15, and thereby forces both of said poppet valves to unseat from their respective valve seats, in a manner as will be subsequently described.

Figure 3:
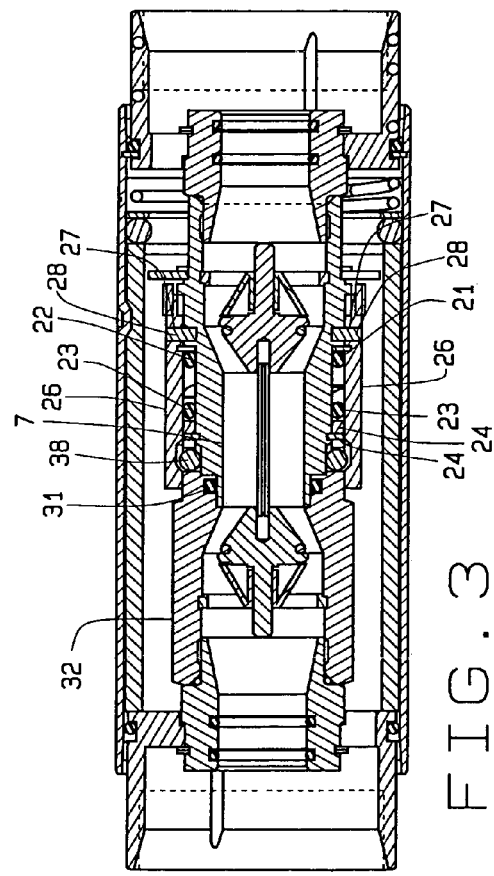
FIG. 3 is a longitudinal sectional view of the disposable breakaway nozzle connector in its assembled and usable condition; and, FIG. 4 is a section view of the disposable breakaway nozzle with the male and female fittings separated.

In referring to FIG. 3, which provides a cross-sectional longitudinal view of the breakaway hose connector of this invention, the connector is shown in its assembled state, ready for usage and application within a fluid flow line, or having a fuel line threadily engaged at one end, and a nozzle connected at the other. These components will threadily connect with the thread means 9, or 34, provided at either end of the respective fittings 7 and 32. FIG. 3 then shows the location and formation of the pressure chamber in more detail. Inside of the sleeve, the male fitting has a generally hollow cylindrical shape. Centered in the male fitting, a spacer means 47 is oriented parallel to the length of the connector. The spacer means extends outward from the male fitting and inserts within the female fitting when the connector 1 is fully assembled. The male fitting has a front with a slightly lesser diameter than the inner sleeve 26 of the female fitting. The front has an interior groove 30 upon its circumference. Within the groove, the present invention has the third O-ring. The third O-ring 31 remains in position due to the two walls of the groove. Upon connection of the male fitting to the female fitting, the third O-ring slides upon and seals the forward extension 12 front of the female fitting.

The female fitting has an inner sleeve, cylindrical and slightly wider than the forward extension 12. The inner sleeve surrounds the female fitting but forms an annular space between the inner sleeve and the forward extension 12. Where the male fitting abuts the inner sleeve, the female fitting has a plurality of locking ball 38. The locking bearings 38 remain fixed in their location or detents 37 relative to an end of the connector. Detents in the interior of the inner sleeve and the first retaining ring keep the locking bearings in position. Opposite the locking bearings, the female fitting has two shear pins 28. The shear pins are coaxial and diametrically opposed. The shear pins extend through the inner sleeve at holes 27 and partially into the interior of the female fitting. The shear pins 28 have a generally solid cylindrical shape. As mentioned earlier, pressure fluctuations, vibrations, and other forces are transmitted to the connector then through the male fitting and the female fitting. The detents and first retaining ring permit the locking bearings to move slightly. Upon sufficient axial force being applied to the female fitting, the female fitting will slide away from the male fitting generating a shear force that breaks the shear pins and allows the female fitting to separate from the male fitting.

The various component parts as previously described can be readily seen assembled within this view, and include the fitting 7, which has its nut like portion 8 integrally formed with a forward extension 10, and having the further forward extension 12, as noted. The mount 14 supports the poppet valve 15 within the fitting, and arranges it for seating against the valve seat 18, as when the connector separates. In addition, the outer sleeve 4 connects onto the fitting 7, and is disposed for limited sliding movement thereon, but which is reasonably locked in position by means of the locking means or seal ring 21, as previously explained. In addition, provided for limited sliding but sealed contact upon the extension 12.

The fitting 32 is disclosed inserted within the opposite end of the outer sleeve 4, and carries the detent balls 38 within seats at its one end, as previously explained, and likewise incorporates its mount 39, for retaining the poppet valve 40 in proximity and in alignment with the valve seat. But, when the connector is assembled, the spacer means 47 biases against both of the poppet valves, and displaces them from their respective valve seats, so as to provide a clear flow path, as at 36, through the connector. This flow path could be in either direction, but as explained herein as moving from left to right, simply for illustrative purposes.

The various pressures pre-designed into the connector of this invention are calculated to furnish the required strength to maintain the breakaway hose connector in its operative configuration, and to resist separation. Obviously, this type of pressure can be varied, depending on the resiliency and the spring strength, built into the device. But in the preferred embodiment, it has been designed to withstand tensioning forces exerted upon the fuel line hose of approximately two hundred pounds. Most of this force is attained through the springs, which must be contracted, through the exertion of the force placed upon them. On the other hand, the amount of force required to re-engage the connector is calculated within the range of approximately twenty pounds of compression pressure exerted upon the two fitting, as they are pushed back together, into re-engagement. This paragraph describes a re-connectable breakaway. This unit is not re-connectable.

At times, the shear pins 28 break due to pressure fluctuations induced by the fuel flow. The present invention adds a first O-ring 23 and a second O-ring 22 mutually parallel and spaced apart between the locking bearings 38 and the shear pins 28. The first O-ring and the second O-ring occupy the annular space between the inner sleeve and the forward extension 12. Retaining rings, wave spring, and friction maintain the separation between the first and second O-ring as the pressure chamber as further shown in FIG. 3. The wave spring is shown at 22a in FIG. 3. The first and second O-rings abut the inner sleeve and the forward extension thus sealing the pressure chamber. The pressure chamber attains the same pressure as the ambient line pressure during fuel flow through the connector. When fuel stops abruptly, the pressure chamber buffers any additional pressure transferred through the locking bearings generally towards the shear pins.

To produce a normal disengagement of the connector device, a tensioning force may be exerted upon the fuel line in which the coupler is located. The pressure chamber absorbs the pressure caused by "water hammer" in a fuel line. In doing so, the pressure chamber removes spiked pressure induced forces from the shear pins. The shear pins remain subject solely to shear forces induced by pulling or other external action upon the connector. When a tension force is exerted upon the connector, by way of the fuel line hoses, as when a drive away occurs, said forces are exerted directly upon the fittings 7 and 32.

Figure 4:
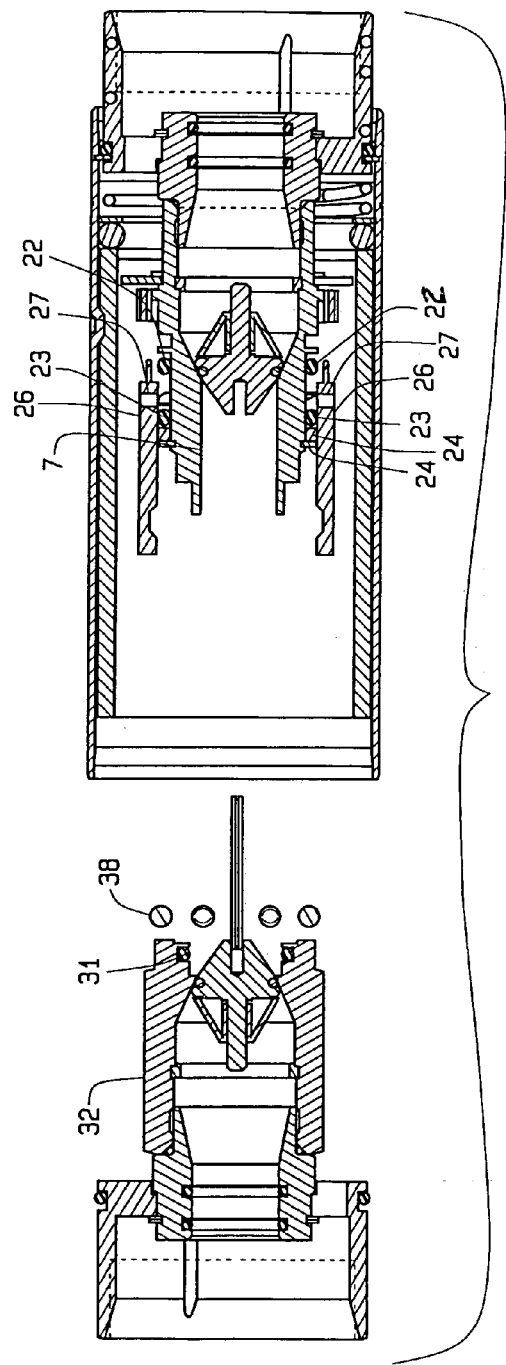

On the other hand, as the tensioning pressure builds up and approaches, in this particular embodiment, the same pressure is exerted upon the fitting 7, through its interconnected hose, and this force tends to pull the fitting 7 to the right, slightly out of its outer sleeve 4, in an effort that tends to withdraw the fitting 7 slightly from within the outer sleeve 4 to provide for an instantaneous disengagement of the fitting 32 from within the outer sleeve 4, and disconnection from the fitting 7, as can be readily seen in FIG. 4. As this occurs, simultaneously the spacer means 47 allows the poppet valve 40 to be spring biased against its valve seat, while simultaneously, the poppet valve 15 is spring biased against its respective valve seat.

Thus, when disconnection has occurred, because of the exertion of the tensioning force upon the fuel line in which the connector inserts, and through the exertion of such force physically upon the connector 1 itself, the connector disconnects, the various poppet valves instantaneously close, preventing the flow or leakage of any further fuel, even though a break has occurred, thereby preventing the hazardous spillage of fuel or other fluids onto the surrounding area, as previously explained.

FIG. 4 illustrates the male fitting 32 separated from the female fitting 7. The male fitting retains the spacer means 47 as the poppet valve seats itself as the spring expands under its bias. The male fitting 32 carries the third O-ring 31 within a groove 30 upon the inner diameter of the forward portion of the extension 35. Detached and separated from the male fitting, the female fitting 7 carries the majority of the present invention. The female fitting 7 has the first O-ring 23 and the second O-ring 22 mutually spaced apart along the forward extension 12 and then secured by retaining rings 21, 24, 25. The first and second O-rings bear upon the forward extension and fit within the inner sleeve 26. At the forward edge of the female fitting, a plurality of locking bearings 38 occupies the space between the forward extension and an inner groove toward the end of the inner sleeve 26. Opposite the locking bearings, the female fitting has shear pins 28 inserted through holes 27 in the inner sleeve 26 and holes 29 into the extension 12. The shear pins 28 secure the inner sleeve 26 to the female fitting 7.

Thus, this invention provides a breakaway hose connector that prevents untimely spillage when a disconnection occurs within a fuel line. Internal pressure arises from pressure spikes that occur within the fuel that flows through the flow line, and though the spikes may reach excessive pressure levels, this invention locates fuel at precise positions and chambers within the device. The internal pressure provides a balancing of forces between these pressures, which prevents an untimely breakaway of the device thus avoiding unnecessary leakage, when such an internal fluid pressure predicament occurs.

From the aforementioned description, a disposable breaker nozzle connector has been described. This breaker connector is uniquely capable of reducing water hammer in a fuel line thus maximizing the strength and life of shear pins. This breaker connector and its various components may be manufactured from many materials including but not limited to polymers, low density polyethylene, high density polyethylene, polypropylene, nylon, ferrous and non-ferrous metals, their alloys, and composites.

Variations or modifications to the subject matter of this invention may occur to those skilled in the art upon reviewing the development as described herein. Such variations, if within the scope of this development, are intended to be encompassed within the principles of this invention, as explained herein. The description of the preferred embodiment, in addition to the depiction within the drawings, are set forth for illustrative purposes only.

I claim:

1. A fluid breakaway connector for connecting fluid line sections or attachments comprising:

a first fitting of generally tubular shape connectable to one section of fluid flow line;

a second fitting of generally tubular shape connectable to the other section of fluid flow line and including a second extension therewith said second extension having a circumferential groove and an inner sleeve coaxial with said second fitting, concentric with said coaxial extension, and having a length approximately that of said second extension;

said first and second fittings being slidably connected within an outer sleeve, said fittings being held together by a detent means, said detent means engaging said circumferential groove and being disposed to release upon exceeding a pre-determined tensile force;

said first and second fittings forming a fuel flow passage;

said first and second fittings having check valves, each fitting having a valve seat for the seating of its respective check valves after decoupling of said breakaway connector, one of said check valves having a first extension therewith in said first fitting, and disposed for encountering the other check valve means during breakaway to hold the check valves unseated from their respective valve seats and allowing fluid and vapors to pass through the concentric flow lines and said connector during normal usage;

said first and second fittings having connector mounts for securing said check valves to the fittings, said connector mounts allow fluid flow therethrough, and disposed to allow vapor flow through said fuel flow passage;

said check valves having cooperating internal vapor passages, said vapor passages cooperatively connected to said fuel flow passage of each connector mount to allow vapors to flow through said vapor passage and out through a spider connector concentric section;

means for blocking said flow of fluid and vapors through said connector when said connector is decoupled; and a chamber formed between said inner sleeve and said second fitting and disposed for the reception therein of fluid from the flow line to provide for equalization of fluid forces generated within said device during routine fluid flow to prevent premature decoupling of said connector and leakage from said connector.

2. The fluid breakaway connector of claim 1 further comprising:

said first fitting having an internal circumferential groove and a third O-ring seated within said groove, said third O-ring sliding over said extension of said second fitting; and, said second fitting having a second O-ring and a first O-ring mutually parallel, spaced apart, and concentric thus forming said chamber between said O-rings;

wherein said first O-ring absorbs fluid forces induced by said third O-ring upon said second fitting;

wherein said second O-ring absorbs fluid forces induced by said third O-ring upon said first fitting.

3. The fluid breakaway connector of claim 2 wherein said first and second fittings are connectable to a concentric hose in which the vapor flow chamber is internal to the fluid flow chamber.

4. The fluid breakaway connector of claim 2 wherein the material of said detent means can be replaced to allow separation of the breakaway connector upon a predetermined tensile force.

5. The fluid breakaway connector of claim 4 wherein the breakaway connector is disposable.

6. The fluid breakaway connector of claim 4 wherein the tensile force required for disconnection of said first and said second fittings within said outer sleeve is variable.

7. A fluid breakaway connector of a generally tubular shape for connecting fluid line sections or attachments comprising:

a first fitting having a forward end, an inner groove upon the perimeter of the forward end, and an O-ring seating upon said inner groove; and, a second fitting having a forward end that engages the forward end of said first fitting, a forward extension having a circumferential groove, two or more o-rings mutually parallel, spaced apart, and upon the perimeter of the forward extension, an inner sleeve surrounding said o-rings and said forward extension, a plurality of locking bearings proximate to the forward end and contained between said inner sleeve and said forward extension, and one or more shear pins opposite said forward end placed through said inner sleeve and into said circumferential groove of said forward extension;

said o-rings upon said second fitting form a chamber upon said forward extension and inside said inner sleeve to equalize pressures within said chamber and outside said o-rings and to reduce premature breakage of said shear pins when an imbalance in pressure arises within said chamber and outside said o-rings.

8. The fluid breakaway connector of claim 7 including a first O-ring and a second O-ring upon said forward extension of said second fitting and a third O-ring upon said inner groove of said first fitting, wherein said first O-ring absorbs fluid forces induced by said third O-ring upon said second fitting and said second O-ring absorbs fluid forces induced by said third O-ring upon said first fitting.

9. The fluid breakaway connector of claim 7 wherein said first and second fittings are connectable to a concentric hose in which the vapor flow chamber is internal to the fluid flow chamber.

10. The fluid breakaway connector of claim 7 wherein the material of one of said locking bearings or said shear pins can be replaced to allow separation of the breakaway connector upon a predetermined tensile force.

11. The fluid breakaway connector of claim 10 wherein the breakaway connector is disposable.

12. The fluid breakaway connector of claim 10 wherein the tensile force required for disconnection of said first and said second fittings within said outer sleeve is variable.

13. The fluid breakaway connector of claim 4 wherein the breakaway connector can be reassembled after separation.

14. The fluid breakaway connector of claim 10 wherein the breakaway connector can be reassembled after separation.

* * * * *